United States Patent Office 2,977,385
Patented Mar. 28, 1961

2,977,385
PROCESS FOR PRODUCING LACTONE ADDUCTS

George W. Fowler and Thomas F. Carruthers, South Charleston, W. Va., assignors to Union Carbide Corporation, a corporation of New York No Drawing. Filed Apr. 13, 1956, Ser. No. 577,949

8 Claims. (Cl. 260—475)

The present invention relates to lactone adducts that are useful as plasticizers and as intermediates for preparing elastomers and foams, to resins plasticized with such adducts, and to a method of preparing them.

We have discovered that certain lactones are admirably suited for reaction with alcohols, amines and amino alcohols, referred to herein as initiators, to prepare adducts that include esters, i.e., mono- and polyesters, amides, i.e., mono- and polyamides, as well as amide esters and amide polyesters. These adducts, which may be of widely varying and readily controllable molecular weight, are characterized by the presence of one or more lactone residues which, in the polyesters, are interconnected to form one or more series of substantially linear groups derived from one or more lactones. They are eminently useful as plasticizers for vinyl halide and other resins as well as for reaction with diisocyanates in the preparation of elastomers and foams. This is true particularly of the polyesters in which at least a substantial proportion of the lactone residues are substituted.

The products with which this invention is concerned include adducts of initiators with individual unsubstituted and substituted lactones, with mixtures of different substituted lactones and with mixtures of substituted and unsubstituted lactones, as well as blends thereof.

The lactone used as a starting material may be any lactone, or combination of lactones, having at least six carbon atoms in the ring and represented by the general formula:

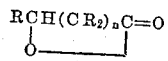

in which $n$ is at least four, at least $n+2$ R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

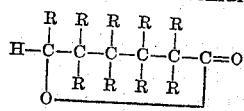

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms of the lactone are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be polymerized in accordance with the method of the invention.

The various lactones may be utilized individually or in combination. When lactone adducts prepared in accordance with the invention are intended to be used as intermediates for reaction with diisocyanates in the preparation of polyurethanes, it is generally preferred to utilize mixtures of substituted and unsubstituted lactones in order to achieve optimum non-hardening characteristics. If on the other hand the adducts are to be employed as plasticizers, optimum results are obtainable with adducts derived from monomethyl substituted lactones and with adducts derived from mixtures of unsubstituted and monomethyl substituted lactones. Generally, however, the choice of initial lactone or combinations of lactones is practically unlimited except in so far as is pointed out with reference to the tendency of highly substituted lactones to revert to monomeric forms, particularly at higher temperatures.

The initiators that are capable of reacting with lactones and of forming with them the adducts of the invention, are compounds having at least one reactive hydrogen capable of opening the lactone ring and adding it as an open chain without forming water of condensation. Compounds that are suitable as initiators, are represented by the general formula

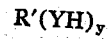

in which R' is an organic radical selected from the group consisting of aliphatic, cycloaliphatic, aromatic and heterocyclic radicals, $y$ is a number equal to the functionality of the initiator, and the Y's stand for —O—, —NH— and —NR"—, R" being alkyl, aryl, aralkyl or cycloalkyl. These include monofunctional initiators such as alcohols and amines, and polyfunctional initiators such as polyols, polyamines, amino alcohols, and vinyl polymers, as well as amides, sulfonamides, hydrazones, semicarbazones and oximes.

Alcohols that are useful as monofunctional initiators include primary, secondary, and tertiary aliphatic alcohols such as methanol, ethanol, propanol, isopropanol, 1-butanol, 2-butanol, tert.-butanol, 1-pentanol, 3-pentanol, tert.-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol.

Amines that are useful as monofunctional initiators include primary and secondary aliphatic amines such as methyl, ethyl, n-propyl, isopropyl, n-butyl, sec.-butyl, isobutyl, tert.-butyl, n-amyl, n-hexyl and 2-ethylhexylamine, as well as the corresponding dialkyl amines; aromatic amines such as aniline, ortho-toluidine, meta-toluidine, para-toluidine, and diphenylamine; cycloaliphatic amines such as cyclohexyl- and dicyclohexylamine; and heterocyclic amines such as pyrrolidine, piperidine, and morpholine.

Diols that are suitable as bifunctional initiators include glycols of the formula $HO(CH_2)_nOH$ in which $n$ equals 2 to 10, glycols of the formulae $HO(CH_2CH_2O)_nH$ and $HO[CH(CH_3)CH_2O]_nH$ in which $n$ equals 1 to 40, 2,2-dimethyl-1,3-propanediol, 2,2-diethyl-1,3-propanediol, 3-methyl-1,5-pentanediol, N-methyl- and N-ethyl diethanolamines, various cyclohexanediols,

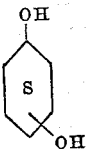

4,4'-methylenebiscyclohexanol,

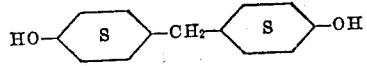

4,4'-isopropylidenebiscyclohexanol,

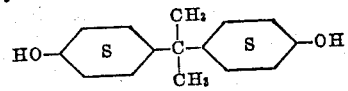

various xylenediols,

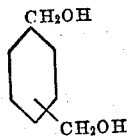

various hydroxymethyl-phenethyl alcohols,

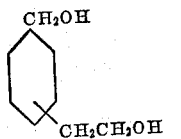

various hydroxymethyl-phenylpropanols,

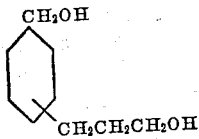

various phenylenediethanols,

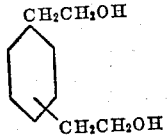

various phenylenedipropanols,

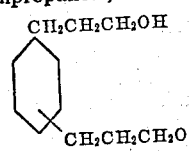

and various heterocyclic diols such as 1,4-piperazine-diethanol.

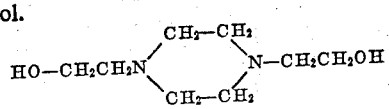

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamido, or carboxyl groups. They are obtainable by reacting diols of the class $HO(CH_2)_nOH$, where $n$ equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorous acid; aliphatic, aromatic, and cycloaliphatic primary monoamines, like methylamine, ethylamine, propylamine, butylamine, aniline, cyclohexylamine; secondary diamines, like N,N'-dimethylethylenediamine; and amino-alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

The preparation of the polyoxyalkylated derivatives suitable for the purposes of the invention is illustrated by the reaction of 1,4-butanediol with ethylene oxide:

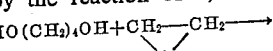

$$H(OCH_2CH_2)_xO(CH_2)_4O(CH_2CH_2O)_yH$$

where $x+y=1$ to 40.

Other useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides; or anhydrides of inorganic and organic acids; and inorganic acids or anhydrides thereof whose anions show little tendency to polarize. Polymers containing hydroxyl end groups can be obtained by treating these products with alkaline reagents upon completion of the polymerization reaction. Among suitable monoepoxides for preparing such polymers are tetrahydrofuran, trimethylene oxide, propylene oxide, ethylene oxide and mixtures thereof.

Higher functional alcohols suitable for reacting with lactones in accordance with the method of the invention include triols such as glycerol, trimethylolpropane, 1,2,4-butanetriol, 1,2,6-hexanetriol, N-triethanolamine, and N-triisopropanolamine; various tetrols like erythritol, pentaerythritol, N,N,N',N'-tetrakis(2-hydroxyethyl)ethylenediamine, $$\begin{array}{c}HOCH_2CH_2\\HOCH_2CH_2\end{array}NCH_2CH_2N\begin{array}{c}CH_2CH_2OH\\CH_2CH_2OH\end{array}$$

and N,N,N',N'-tetrakis(2-hydroxypropyl)ethylenediamine;

$$\begin{array}{c}CH_3\\|\\HOCHCH_2\\HOCHCH_2\\|\\CH_3\end{array}NCH_2CH_2N\begin{array}{c}CH_3\\|\\CH_2CHOH\\CH_2CHOH\\|\\CH_3\end{array}$$

pentols; hexols like dipentaerythritol and sorbitol; alkyl glycosides; and carbohydrates such as glucose, sucrose, starch, and cellulose.

Also suitable as polyols are the polyoxyalkylated derivatives of polyfunctional compounds having three or more reactive hydrogen atoms as, for example, the reaction product of trimethylolpropane with ethylene oxide in accordance with the reaction:

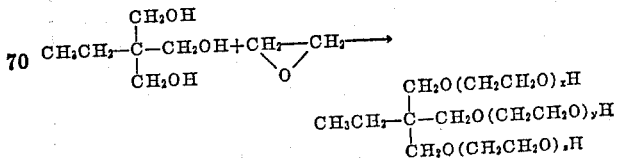

where $x+y+z=3$ to 45.

In addition to the polyoxyalkylated derivatives of trimethylolpropane, those of the following compounds are likewise suitable: glycerol, 1,2,4-butanetriol, 1,2,6-hexanetriol, erythritol, pentaerythritol, sorbitol, methyl glycosides, glucose, sucrose, diamines of the general formula $H_2N(CH_2)_nNH_2$, where $n$ equals 2 to 10, 2-(methylamino)ethylamine, various phenylene- and toluene-diamines, benzidine, 3,3'-dimethyl-4,4'-biphenyldiamine, 4,4'-methylenedianiline, 4,4',4''-methylidynetrianiline, cycloaliphatic diamines, like 2,4-cyclohexanediamine and 1-methyl-2,4-cyclohexanediamine, amino alcohols of the general formula $HO(CH_2)_nNH_2$, where $n$ equals 2 to 10, diethylenetriamine, triethylenetetramine, tetraethylenepentamine, poly-carboxylic acids like citric acid, aconitic acid, $$HOOC-CH=C-CH_2-COOH$$
$$\qquad\qquad |$$
$$\qquad\quad COOH$$

mellitic acid,

[structure: benzene ring with COOH at all six positions]

and pyromellitic acid,

[structure: benzene ring with four COOH groups at 1,2,4,5 positions]

and polyfunctional inorganic acids like phosphoric acid.

Difunctional amino alcohols capable of reacting with lactones include aliphatic amino alcohols of the general formula $HO(CH_2)_nNH_2$, where $n$ equals 2 to 10, N-methylethanolamine, $$HOCH_2CH_2\overset{CH_3}{\underset{}{N}}H$$

isopropanolamine, $$HO\overset{CH_3}{\underset{}{C}}HCH_2NH_2$$

N-methylisopropanolamine, $$HO\overset{CH_3}{\underset{}{C}}HCH_2\overset{CH_3}{\underset{}{N}}H$$

aromatic amino alcohols like para-amino-phenethyl alcohol,

[structure: benzene ring with CH₂CH₂OH and NH₂]

and para-amino-alpha-methylbenzyl alcohol,

[structure: benzene ring with CHOHCH₃ and NH₂]

and various cycloaliphatic amino alcohols like 4-aminocyclohexanol.

[structure: ring with OH, S, and NH₂]

Higher functional amino alcohols having a total of at least three hydroxy and primary or secondary amino groups that are suitable in the method of the invention include diethanolamine, diisopropanolamine, 2-(2-aminoethylamino)ethanol $H_2NCH_2CH_2-NH-CH_2CH_2OH$, 2-amino-2-(hydroxymethyl)-1,3-propanediol, $$HOCH_2-\overset{NH_2}{\underset{CH_2OH}{C}}-CH_2OH$$

Suitable diamines include aliphatic diamines of the general formula $H_2N(CH_2)_nNH_2$, monosecondary diamines of the general formula $R''NH(CH_2)_nNH_2$, and disecondary diamines of the general formula $$R''NH(CH_2)_nNHR''$$

where $n$ equals 2 to 10 and where $R''$ is alkyl, aryl, aralkyl or cycloalkyl; aromatic diamines, like meta-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3'3,-dimethoxy-4,4'-biphenyldiamine, 3,3'-dichloro-4,4'-biphenyldiamine, 4,4'-methylenedianiline, 4,4'-ethylenedianiline, 2,3,5,6-tetramethyl-para-phenylenediamine, 2,5-fluorenediamine, and 2,7-fluorenediamine; cycloaliphatic diamines like 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis-(3-aminopropyl)piperazine.

$$H_2N-CH_2CH_2CH_2N\begin{array}{c}CH_2-CH_2\\ \\CH_2-CH_2\end{array}N-CH_2CH_2CH_2NH_2$$

Higher functional polyamines typical of those suitable for use in the method of the invention are: diethylenetriamine, triethylenetetramine, tetraethylenepentamine, dipropylenetriamine, tripropylenetetramine, tetrapropylenepentamine, 1,2,5-benzenetriamine, toluene-2,4,6-triamine, and 4,4',4''-methylidynetrianiline,

[structure: triphenylmethane with three NH₂ groups]

and polyamines obtained by interaction of aromatic monoamines with formaldehyde or other aldehydes, for example:

[reaction scheme showing 3 aniline derivatives + 2CH₂O producing methylene-bridged polyaniline structure with R² substituents]

and other reaction products of the above general type, where $R^2$ is H or alkyl.

Lactones will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula:

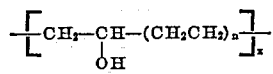

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, or para-aminostyrene,

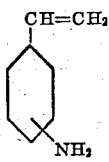

3 - butene - 1,2 - diol $CH_2=CH-CHOH-CH_2OH$, allyl alcohol, methallyl alcohol, 3-phenyl-3-butene-1-ol,

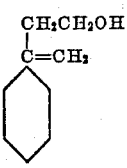

and vinyl ethers like diethylene glycol monovinyl ether $CH_2=CHOCH_2CH_2OCH_2CH_2OH$.

The initiator is believed to open the lactone ring to produce an adduct having one or more terminal hydroxyl groups that are capable of opening further lactone rings and thereby of adding more and more lactone to the molecule. Thus, for example, a polymerization of epsilon-caprolactone initiated with an amino alcohol is believed to take place primarily as follows:

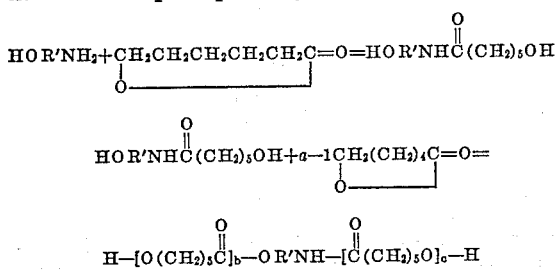

wherein $a$ is the total number of mols of lactone reacted per mol of initiator and $b+c=a$. This may be expressed more conveniently by the formula

in which each $L_x$ stands for one or a series of epsilon-caprolactone residues, the terminal carbonyl groups of which are linked to one another by means of oxy and amino groups attached to the bivalant organic R' radical and the terminal oxy groups at the free ends of the series being attached to hydrogen and forming terminal hydroxyl radicals. The $x$'s average at least one and their sum is equal to $a$.

Similarly, a monoamine opens and adds a succession of lactone rings as shown in the equation:

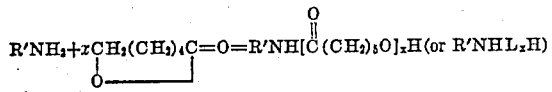

It will be apparent from these equations that the formation of a lactone adduct in accordance with one embodiment of the method of the invention can be summarized by the equation:

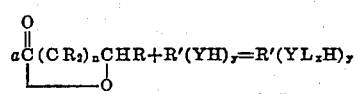

in which $R'(YH)_y$ corresponds to the initiator, $y$ being a number equal to the functionality of the initiator, i.e., at least one; the average value of $x$ is $a/y$ and at least one and preferably a number large enough to make the total molecular weight of the adduct at least about 300, and the L's stand for substantially linear groups having the general formula:

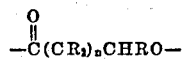

in which $n$ is at least four, at least $n+2$ R's are hydrogen, the remaining R's are substituents selected from the group consisting of hydrogen, alkyl, cycloalkyl, alkoxy and single ring aromatic hydrocarbon radicals, and the total number of carbon atoms in the substituents on a given residue does not exceed about twelve. The number of groups in the final adduct will depend in large part upon the molar ratio of lactone to initiator.

To start the reaction and, in the preferred embodiment, continue polymerization of the lactone, the lactone and the initiator are preferably heated to a temperature between about 100 and 210° C. in the presence of an acidic catalyst. The temperature may be considerably lower however, i.e., as low as about 50° C. at the sacrifice of speed of reaction. It may also be considerably higher, i.e., up to about 250° C., although care must be taken at such higher temperatures because of the more likely losses, at temperatures above 250° C., due to decomposition or undesirable side reactions. Generally, therefore, a temperature range of 50 to 250° C. is considered operable and a more limited range between about 100 and 210° C. is considered preferable.

The acidic catalyst employed in the method of the invention may be an organic acid or anhydride such as acetic acid, acetic anhydride, 2-ethylhexanoic acid and benzoic acid, or a mineral acid such as aqueous hydrochloric acid. Catalyst concentrations may be as low as about 0.001 and, depending upon the catalyst used and the type of terminal groups ultimately desired in the adduct, may be as high as about 2% by weight based on the total charge. When an adduct is prepared with a bifunctional initiator and is to have a maximum of reactive terminal hydroxyl groups for optimum utility in the preparation of a polyurethane, it is preferable to utilize a minimum of catalyst, particularly if the catalyst is an inorganic acid which would tend to introduce recovery problems, or even a low molecular weight organic acid such as acetic acid. When an adduct is prepared for use as a plasticizer, it is still desirable to keep the catalyst concentration as low as possible within the range specified if the catalyst is inorganic. However, since the blocking of a terminal hydroxyl group with an ester group is desirable in an adduct for purposes of reducing its susceptibility to extraction of water, the concentration of organic acid catalysts that may be employed under these circumstances can very well be in the upper portion of the range specified and in some instances even higher.

In order to obtain a lactone adduct having a minimum of discoloration, it is preferable to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120–160° C.

Lactone adducts obtained in accordance with the invention have one or more reactive terminal hydroxyl groups, the number of reactive terminal groups depending upon the functionality of the initiator, and have molecular weights as low as 145 but more generally upwards of about 300. Polyesters are characterized by the presence of series of interconnected, substantially linear units or groups composed of carbon, hydrogen and oxygen. In the monoester or monoamide, there is only one such group. The interconnected groups are opened lactone residues each having a terminal oxy group at one end, a terminal carbonyl group at the other end, an intermediate chain of at least five carbon atoms and at least one hydrogen substituent on the carbon atom in the intermediate chain that is attached to the terminal oxy group. In a polyester, the oxy group of one lactone residue is connected to the carbonyl group of an adjacent lactone residue in the series and the oxy group of the last lactone residue in a series is connected to a hydrogen to form a terminal hydroxyl group at one end of the series.

Adducts having two or more reactive terminal hydroxyl groups (obtained with polyfunctional initiators) are suitable for reaction with isocyanates to form polyurethanes of high molecular weight and superior properties that may be foamed or unfoamed, elastomeric or rigid, as desired. The elastomeric products are outstanding particularly as to flexibility at low temperatures and ability to be stored for indefinite periods of time without premature hardening, especially when prepared from copolyesters of two or more lactones. The difunctional adducts are also eminently suitable for reaction with dicarboxylic acids for forming polymers of the general formula:

$$R'YL_x(AcL_xYR'YL_x)_zH$$
$$|$$
$$YL_xH$$

in which R', Y and $L_x$ are as indicated previously, Ac stands for the diacyl radical of the dicarboxylic acid used in the reaction and z is at least one. Among the many dicarboxylic acids that are suitable in this reaction are oxalic, succinic, maleic, glutaric, adipic, pimelic, suberic, azelaic, sebacic, phthalic, isophthalic and terephthalic acids as well as anhydrides thereof, such as, for example, phthalic anhydride. This reaction is preferably carried out with an excess of polyester so that the product of the reaction will have hydroxyl end groups. The reaction takes place at elevated temperatures of the order of about 120–200° C. and is preferably accomplished in the presence of a diluent such as toluene, xylene and benzene. The reaction is illustrated by the equation:

$$\text{excess } HL_xYR'YL_xH + HOAcOH =$$
$$HL_xYR'YL_x(AcL_xYR'YL_x)_zH$$

In addition, these and other esters and polyesters of the invention, including those having more and less than two reactive terminal hydroxyl groups, are eminently suitable as plasticizers in various resins, e.g., vinyl chloride-vinyl acetate resins, natural rubber, GRS rubber, copolymers of acrylonitrile with ethylenically unsaturated compounds such as butadiene, polyvinyl butyral and poylvinyl chloride, particularly if they are esterified to insolubilize the terminal hydroxyl groups and thus improve their resistance to extraction by water from resins with which they are combined.

Acylation of reactive hydroxyl end groups, in order to make the esters still more resistant to water extraction when used as plasticizers, may readily be accomplished by acylation with an aliphatic or aromatic monobasic acylating agent such as acetic acid, acetic anhydride, 2-ethylhexanoic acid, benzoic acid, or the like, as well as unsaturated acids such as methacrylic acid. This reaction can, if desired, be accelerated by the presence of a minor amount of catalyst such as alkane sulfonic acid, a mixture of methane-, ethane- and propene sulfonic acids. This acylation or esterification will take place as illustrated in the following equations in which $R^3$ stands for an alkyl, alkene, or single ring aromatic hydrocarbon radical:

$$R'(YL_xH)_y + yR^3COOH = R'(YL_x\overset{O}{\overset{\|}{C}}R^3)_y + yH_2O$$

or

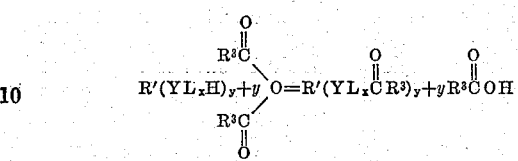

depending upon whether an acid or an acid anhydride is utilized. For convenience, the non-acylated and the acylated esters are represented by the general formula $R'(YL_xZ)_y$, Z being —H or acyl. The reaction may be carried out at temperatures ranging from as low as about 90° C. to about 170° C., the particular temperature selected being governed in part by the boiling point of the acid utilized.

If the ester contains only one terminal hydroxyl group, the acylating or esterifying agent may also be a polybasic acid. Where the molar ratio of the ester is equivalent to the functionality of the acid, the reaction will take the course illustrated immediately below:

$$mR'YL_xH + Ac'(OH)_m = (R'YL_x)_mAc' + mH_2O$$

$m$ representing a number equal to the number of carboxylic acid groups in the polybasic acid represented by $Ac'(OH)_m$ and therefore the functionality of the acid. If desired, the product prepared in accordance with this reaction may be obtained by reacting the initial lactone or lactones simultaneously with a bifunctional initiator such as a diol and a carboxylic acid. It is not necessary, however, to use equivalent amounts of the reactants if the formation of a half ester, for example, is desired as indicated in the equation:

$$R'YL_xH + Ac(OH)_2 = R'YL_xAcOH + H_2O$$

In this case it is usually desirable to esterify the terminal carboxylic acid group by reaction with an alkyl alcohol or an alkyl amine, as shown in the equation:

$$R'YL_xAcOH + Alk\ YH = R'YL_xAc\ Alk + H_2O$$

in which the symbol Ac has been utilized to indicate the diacyl radical of a dicarboxylic acid and Alk stands for alkyl.

As plasticizers, the lactone esters, particularly the polyesters, of the invention have the unique advantage, hitherto so elusive in the development of plasticizers, of combining excellent low temperature performance, i.e., imparting good flexibility to resins even at temperatures below zero, with low volatility and high resistance to water and oil extraction. They are available as easily-pourable liquids, and are therefore susceptible to facile handling and mixing as compared with the highly viscous, nonpourable plasticizers heretofore available. At the same time, the plasticizers of the invention are non-toxic and light-stable.

The preparation of esters in accordance with the method of this invention has the unique advantage of permitting accurate control over the average molecular weight of the ester, and further of promoting the formation of a substantially homogeneous ester in which the molecular weights of the individual molecules are substantially all very close to the average molecular weight. This control is obtained by preselecting the molar proportions of lactone and initiator in a manner that will readily be appreciated by those skilled in the art. Thus, for example, if it is desired to form a polyester in which the average molecular weight is approximately ten times the molecular weight of the initial lactone or lactone mixture, then the proportions of lactone to initiator utilized in the polymerization are fixed at approximately 10 : 1 inasmuch as it is to be expected that on the average each molecule of initiator will add on an approximately equal number of lactones and an average of ten lactone molecules would be available to each molecule of initiator.

In preparing polyesters intended for use as intermediates in the preparation of polyurethane elastomers, we prefer to utilize a mixture of substituted and unsubstituted lactones and bifunctional initiator. The relative proportions of lactone to initiator should be such as to produce polyesters having an average molecular weight in the range of about 1900 to 2800. This range of molecular weights is preferred because it yields linearly extended polyester-polyurethane diisocyanate chains of optimum length and promotes the eventual formation of an elastomer having optimum properties of low brittle temperature, tensile strength and non-hardening qualities. It is to be understood, however, that substantial departures can be made from this range of molecular weights, i.e., to as low as about 300 if more rigid properties are desired and to as high as 5000 and even 7000 if greater elasticity is more important than high tensile strength.

The concentration of a lactone ester of the invention as a plasticizer in a resin may vary widely, depending upon the particular results desired. Low concentrations, e.g., as low as about 5% by weight, are employed as processing aids in rigid compositions rather than for plasticizing action. Higher concentrations up to about 50% or even more are used when flexibility is the overriding desideratum.

The method of the invention and the utility of the products obtained thereby will become further apparent from the following detailed examples included to illustrate the best modes presently contemplated for carrying out the invention. In these examples, the acidity is reported in terms of the number of cc. of normal base required to neutralize one gram of ester and the hydroxyl value is reported in terms of percent OH as determined by a modification of the acetic anhydride-pyridine method, similar to that described in Ind. Eng. Chem., Anal. ed., col. 17, pages 394–97. The course of the reaction between the lactone or lactones and initiator was followed, in the examples, by obesrving the refractive index and the reaction was assumed to be complete when the index had reached a maximum.

*Example 1*

228 grams of epsilon-caprolactone and 438 grams of 2-ethyl-1,3-hexanediol were reacted in the presence of 5 cc. of 2-ethylhexanoic acid as catalyst while being heated and stirred together. The reaction was complete in 6.75 hours at 144–180° C. The reaction mixture was distilled in a goose-neck still and 256 grams of unreacted 2-ethyl-1,3-hexanediol were recovered, leaving 406 grams of residue product. The product was a water white liquid having an acidity of 0.0072 cc. N base/g., a hydroxyl value of 10%, a saponification equivalent of 207.1 and a refractive index at $n\ 30/D$ of 1.4618.

300 grams of the hydroxy ester thus obtained were acetylated by heating with 270 grams (50% excess) acetic anhydride for three hours at 125° C. and the product was stripped in a goose-neck still to 205° C. at 3 mm. 372 grams of product were recovered. It was a liquid having a refractive index at $n\ 30/D$ of 1.4473, zero acidity and hydroxyl value, and a molecular weight of 415.

*Example 2*

342 grams of epsilon-caprolactone and 134 grams of trimethylolpropane were reacted in the presence of 5 cc. of 2-ethylhexanoic acid as catalyst by heating and stirring until the refractive index had reached a maximum. This required 3.25 hours at 173–177° C. The reaction product was then acetylated by heating for four hours at 100–110° C. with an excess of acetic anhydride, then stripped in a goose-neck still to 190° C. at 4 mm. and finally steamed for two hours at 148–185° C. at 30 mm. 579 grams of product were recovered. It was a viscous liquid having a color of 8 Gardner, an acidity of 0.0228 cc. N base/g., zero hydroxyl value, a viscosity of 540 cp. at 20° C. and a molecular weight of 770.

*Example 3*

342 grams of epsilon-caprolactone and 92 grams of glycerol were reacted in the presence of 5 cc. of 2-ethylhexanoic acid by heating and stirring until the refractive index had reached a maximum. This required three hours at 130–208° C. The reaction product was acetylated by heating with 420 grams of acetic anhydride for four hours at 110° C., then stripped in a goose-neck still to 175° C. at 8 mm. and finally steamed for two hours at 145–185° C. at 40 mm. The product was a liquid having a color of 8 Gardner, an acidity of 0.0678 cc. N base/g., zero hydroxyl value, a viscosity of 500 cp. at 20° C. and a molecular weight of 830.

*Example 4*

342 grams of epsilon-caprolactone and 438 grams of 2-ethyl-1,3-hexanediol were reacted in the presence of 10 cc. of 2-ethylhexanoic acid by heating and stirring until the refractive index had reached a maximum. The reaction product was stripped in a goose-neck still to leave 575 grams of residue product. The product was a liquid having a color of 1 Gardner, an acidity of 0.0202 cc. N base/g., a refractive index at $n\ 30/D$ of 1.4626 and a hydroxyl value of 8.28%.

500 grams of the product (containing 2.43 mols OH) and 375 grams of 2-ethylhexanoic acid were reacted by refluxing in toluene solution in the presence of 3 cc. alkane sulfonic acid as catalyst, the water being removed through a decanter. The reaction was complete after 13.5 hours at 132–167° C. The reaction product was neutralized with an alcohol solution of potassium hydroxide, then pot stripped to 210° C. at 3 mm. and finally steamed for two hours at 160–177° C. at 40–50 mm. The final product was a liquid having a color of 11 Gardner, an acidity of 0.126 cc. N base/g., a saponification equivalent of 160 and a molecular weight of 600.

*Example 5*

An epsilon-caprolactone/2-ethyl-1,3-hexanediol hydroxy ester was prepared as described in the first paragraph of Example 4. It had a color of 1 Gardner, an acidity of 0.0105 cc. N base/g., a hydroxyl value of 9.13% and a saponification equivalent of 193. 300 grams of this product (containing 1.61 mols OH) and 121 grams (1.29 mol equivalents COOH) of azelaic acid were refluxed in toluene and the evolved water was removed through a decanter. This required 66.5 hours at 123–186° C. The reaction mixture was stripped in a goose-neck still to 175° C. at 3 mm. and then steamed 1.5 hours at 160–177° C. at 40–45 mm. The product, obtained in a yield of 389 grams, had a color of 8 Gardner, an acidity of 0.1285 cc. N base/g., a hydroxyl value of 1.51%, a viscosity of 6000 cp. at 20° C. and a molecular weight of 1575.

*Example 6*

342 grams of epsilon-caprolactone, 372 grams of ethylene glycol and 5 cc. of 2-ethylhexanoic acid were heated and stirred until the refractive index had reached a maximum. This required 7.5 hours at 125–179° C. The reaction mixture was stripped to 181° C. at 4 mm. The residue product, obtained in a yield of 475 grams, was a liquid having a color of 1 Gardner, an acidity of 0.0094 cc. N base/g., a hydroxyl value of 13.55% and a saponification equivalent of 166.6.

400 grams of the product (containing 3.19 mol equivalents OH) and 212 grams (1.32 mols) pimelic acid were refluxed in toluene solution, the evolved water being removed through a decanter. The reaction was complete in fifty-two hours at 124–150° C. The reaction mixture was stripped in a goose-neck still to 175° C. at 4 mm. and then steamed 1.5 hours at 140–175° C. at 40 mm. The final product had a color of 4 Gardner, an acidity of 0.275 cc. N base/g., a hydroxyl value of 1.24%, a saponification equivalent of 111.9, a molecular weight of 1815 and a viscosity of 5200 cp. at 20° C.

*Example 7*

342 grams of epsilon-caprolactone, 115 grams of propylene glycol and 10 cc. of acetic acid were heated and stirred for three hours and twenty minutes at 55–180° C., then stripped in a goose-neck still to 180° C. at 1 mm. to yield 420 grams of a viscous, light yellow liquid having an acidity of 0.016 cc. N base/g. and a hydroxyl value of 7.8%.

400 grams of this product (containing 1.83 mol equivalents OH) and 144 grams (0.77 mol) azelaic acid were refluxed in xylene solution, the evolved water being removed through a decanter. This required 65.5 hours at 146–165° C. The reaction mixture was stripped in a goose-neck still to 190° C. at 3 mm. and then steamed one hour at 160–173° C. at 40–45 mm. to yield 478 grams of a product having a color of 6 Gardner, an acidity of 0.299 cc. N base/g., a hydroxyl value of 0.31%, a molecular weight of 2365 and a viscosity of 17,500 cp. at 20° C.

*Example 8*

228 grams of epsilon-caprolactone, 292 grams of 2-ethyl-1,3-hexanediol and 10 cc. of 2-ethylhexanoic acid were heated and stirred for 7.75 hours at 127–183° C. The reaction mixture was stripped in a goose-neck still to 210° C. at 4 mm. to yield 362 grams of a residue having a color of 5 Gardner, an acidity of 0.0092 cc. N base/g., and a hydroxyl value of 9.14%.

325 grams of the product (containing 1.74 mol equivalents OH) and 116 grams (0.73 mol) adipic acid were refluxed in xylene solution for seventy hours at 146–197° C. The reaction mixture was stripped in a goose-neck still to 183° C. at 3.5 mm. and then steamed for one hour at 145–191° C. at 40–45 mm. to yield 399 grams of a product having a color of 7 Gardner, an acidity of 0.0452 cc. N base/g., a viscosity of 32,000 cp. at 20° C., a hydroxyl value of 0.78% and a molecular weight of 2390.

The acylated products of Examples 1 to 8 were incorporated, as plasticizers, in "Vinylite" VYNW, a copolymer containing 97% vinyl chloride and 3% vinyl acetate, and the resulting plasticized resins were tested to evaluate their pertinent characteristics. In the table immediately following, effectiveness is the concentration of plasticizer based on the total weight of resin plus plasticizer producing an elastomer having an elongation of 100% at 25° C. under a load of 1000 p.s.i. (applied at a constant rate in 74 seconds); the elongation is the increase in length at rupture with the sample at 25° C.; flex temperature ($T_F$) and ($T_4$) are indicative of pliability and are points corresponding to a stiffness modulus of 135,000 p.s.i. and 10,000 p.s.i., respectively, on a temperature-stiffness curve, the stiffness measurements being determined on a Clash & Berg Torsional Stiffness Tester as outlined in ASTM Method D1043–51 (Ind. Eng. Chem., 34, 1218, 1942); the brittle temperature is a measure of flexibility at low temperature and is determined by an impact test as defined in ASTM Method D746–52T; the percent water and oil extraction is the percentage weight loss of four mil films immersed in distilled water and in refined mineral oil, respectively, for a period of ten days at 25° C.; the Durometer "A" hardness is a measure of resistance to indentation of an 0.25 inch specimen by a pin equipped with a truncated cone point as described in ASTM Method D676–49T; the SPI volatility is the percent weight loss of four to six mil films after contact with activated carbon granules for twenty-four hours at 70° C., as described in ASTM Method D1203–52T; and the "sweat-out" is a measure of exudation of the plasticizer on aging at room temperature. The values below "effectiveness" in the table are based on resin containing the "effective" percentage of plasticizer.

| Example No. | 1 | 2 | 3 | 4 | 5 | 6 | 7 | 8 |
|---|---|---|---|---|---|---|---|---|
| Effectiveness, percent in VYNW | 35.4 | 40.9 | 38.3 | 38.8 | 42.2 | 43.7 | 42.2 | 45.0 |
| Tensile strength, p.s.i. | 2,860 | 2,840 | 2,760 | 2,625 | 2,450 | 2,530 | 2,570 | 2,225 |
| Elongation, percent | 375 | 280 | 365 | 395 | 365 | 370 | 370 | 350 |
| ASTM Stiffness Modulus, p.s.i. | 860 | 700 | 700 | 870 | 360 | 760 | 550 | 430 |
| Flex-temperature ($T_F$), ° C. | −33.5 | −24 | −29 | −42 | −31 | −35 | −27 | −25 |
| $T_4$, ° C. | −9 | −4 | −8.5 | −14.5 | −8.5 | −12 | −6 | −4 |
| Brittle temperature, ° C. | −26.5 | −18 | −26 | −42 | −30 | −35 | −29 | −24 |
| Percent Extraction: | | | | | | | | |
| Oil | 15.6 | 7.6 | 9.8 | 19.0 | 4.2 | 1.0 | 0.7 | 0.7 |
| Water | 4.8 | 8.0 | 6.0 | 0.9 | 1.3 | 3.6 | 1.0 | 0.6 |
| Shore Hardness ("A") | 64 | 61 | 63 | 61 | 60 | 60 | 58 | 57 |
| SPI Volatile loss, percent in 24 hrs. at 70° C. | 10.6 | 1.0 | 1.2 | 4.2 | 0.6 | 0.9 | 0.5 | 0.5 |
| Sweat-out: two weeks | None | None | None | Slight | None | None | None | Bloom |

*Example 9*

57 grams of epsilon-caprolactone, a 78 gram mixture of trimethyl-epsilon-caprolactones derived from isophorone, and 13.2 grams of 2,2-diethyl-1,3-propanediol were reacted in the presence of 1 cc. of 2-ethylhexanoic acid as catalyst while being heated under reflux and stirred until the refractive index had reached a maximum of 1.4655. The reaction was complete in 8.5 hours at 165–190° C. The reaction product was stripped at 205° C. and at a pressure of 3 mm. mercury. 111 grams of product were recovered. It was an amber-colored liquid having an acidity of 0.0861 cc. N base/g., a hydroxyl value of 2.80% and an estimated molecular weight of approximately 1200.

The polyester, believed to contain an average of about five unsubstituted lactone residues and an average of about three to four trimethyl substituted lactone residues per molecule was found, upon further reaction with a diisocyanate and a diol, to be suitable as a starting material for a polyurethane resin.

*Example 10*

114 grams of epsilon-caprolactone, 128 grams of methyl-epsilon-caprolactone and 93 grams of aniline were heated and stirred together until the refractive index had reached a maximum. This required six hours at 177–220° C. The reaction mixture was stripped at 204° C. and at a pressure of 3 mm. mercury. 311 grams of product were recovered. It was a dark colored, viscous liquid having a nitrogen content of 3.8%, a hydroxyl value of 4.5%, an acidity of 0.0425 cc. N base/g. and a molecular weight of 402.

266 grams of this aromatic, amide-ester prepared without the use of a catalyst were acetylated by heating with 110 grams (50% excess) of acetic anhydride for three hours at 103–110° C. After stripping to 158° C. at 3 mm., there remained 312 grams of a dark colored, viscous liquid having acidity of 0.579 cc. N base/g. and nil hydroxyl value.

Example 11

171 grams of epsilon-caprolactone, 192 grams of methyl-epsilon-caprolactone and 51.5 grams of diethylenetriamine were heated and stirred with 4 grams of acetic acid until the refractive index had reached a maximum. This required 4⅓ hours at 117–153° C. The reaction mixture was stripped in a goose-neck still to yield 401 grams of residue product. This product was an amber colored, very viscous liquid having a nitrogen content of 5.3% and a hydroxyl value of 6.8%.

While the molecular weight of this product could not be obtained by the usual ebullioscopic method, calculation from nitrogen content indicated that it was 790. This figure, compared with the hydroxyl content, indicates that the diethylenetriamine behaved as a trifunctional compound.

346 grams of the adduct so prepared was acetylated by heating for three hours at 127–140° C. with 225 grams (50% excess) of acetic anhydride. Stripping in a goose-neck still yielded 408 grams of a dark colored, viscous liquid having an acidity of 0.138 cc. N base/g. and nil hydroxyl value.

Example 12

228 grams of epsilon-caprolactone and 130 grams of 2-ethylhexanol were refluxed with 5 cc. acetic acid in 300 cc. of xylene for 5.25 hours at 152–180° C. The reaction mixture was stripped in a goose-neck still to a kettle temperature of 182° C. at 4 mm., leaving 328 grams of residue product. This product was a viscous liquid having a color of 1 Gardner, an acidity of 0.017 cc. N base/g., a refractive index at $n\ 30/D$ of 1.4552, a hydroxyl value of 4.02% and a molecular weight of 442. The combining ratio of caprolactone to 2-ethylhexanol was 2.7:1 as calculated from the molecular weight.

Example 13

228 grams of epsilon-caprolactone were reacted with 97 grams of 2-ethylhexanol in the presence of 5 cc. 2-ethylhexanoic acid as catalyst by heating and stirring for three hours at 140–205° C. The heating was stopped when the refractive index had reached a maximum. The reaction mixture was stripped in a goose-neck still to a kettle temperature of 220° C. at 1 mm., 228 grams of residue product being recovered. This product was a viscous liquid having a color of 3 Gardner, a viscosity of 160 cp. at 20° C., an acidity of 0.0062 cc. N base/g., a hydroxyl value of 3.07%, and a molecular weight of 570. The combining ratio of caprolactone to 2-ethylhexanol was 3.86:1 as calculated from the molecular weight. This product was compatible with "Vinylite" VYNW resin.

Example 14

342 grams of epsilon-caprolactone were reacted with 49 grams of 2-ethylhexanol in the presence of 5 cc. ethylhexanoic acid by heating and stirring for six hours at 170–188° C., the reaction being stopped when the refractive index had reached a maximum. The reaction mixture was stripped in a goose-neck still to a kettle temperature of 175° C. at 2 mm. 388 grams of a residue product was recovered. It was a soft, tan-colored wax having an acidity of 0.066 cc. N base/g., a hydroxyl value of 1.59% and a molecular weight of 1100. The combining ratio of caprolactone to 2-ethylhexanol was 8.6:1 as calculated from the molecular weight.

Example 15

342 grams of epsilon-caprolactone and 1224 grams of n-hexanol were reacted in the presence of 5 cc. of 2-ethylhexanoic acid by heating and stirring for 6.75 hours at 133–166° C., the reaction being stopped when the refractive index had reached a maximum. The reaction mixture was distilled and 463 grams of product were recovered. The product was a water-white liquid having a boiling point of 144–147° C. at 2.5–3.1 mm., a density at 20/20 of 0.943, an index of refraction at $n\ 30/D$ of 1.4402 and a saponification equivalent of 217 (theory 216). The yield was 71.5%.

Example 16

228 grams of epsilon-caprolactone were reacted with 816 grams of 10 carbon oxo alcohol (made by the oxo reaction on tripropylene) in the presence of ten grams of 2-ethylhexanoic acid by heating and stirring for six hours at 175–193° C. The reaction mixture was distilled to yield 319 grams of product. The product was a water-white liquid having a boiling point of 153–160° C. at 1.4–1.5 mm., a density at 20/20 of 0.925, an index of refraction at $n\ 30/D$ of 1.4482 and a saponification equivalent of 281 (theory 272). The yield was 58.6%.

Example 17

342 grams of epsilon-caprolactone were reacted with 1200 grams of cyclohexanol in the presence of 20 cc. of 2-ethylhexanoic acid by heating and stirring for ten hours at 115–158° C., the reaction being stopped when the refractive index had reached a maximum. The reaction mixture was distilled and 308 grams of product were recovered. The product was a water-white liquid having a boiling point of 122–120° C. at 3–1.5 mm., an acidity of 0.0485 cc. N KOH/g., a density at 20/20 of 1.0156, an index of refraction at $n\ 30/D$ of 1.4608, a saponification equivalent of 193 (theory 214) and a hydroxyl value of 7.2% (theory 7.9%). The yield was 48%.

Example 18

228 grams of epsilon-caprolactone were reacted with 994 grams of the butyl ether of ethylene glycol, $C_4H_9OCH_2CH_2OH$, available on the market as butyl "Cellosolve" in the presence of 10 cc. of 2-ethylhexanoic acid as catalyst by heating and stirring for 8.3 hours at 172–175° C. The reaction was stopped when the refractive index of the reaction mixture had reached a maximum. The reaction mixture was distilled and a 240 gram fraction was recovered. It was a water-white liquid having an acidity of 0.0566 cc. N base/g., a density at 20/20 of 0.945, an index of refraction at $n\ 30/D$ of 1.4419 and a saponification equivalent of 232 (theory 232). The yield was 51.7%.

Example 19

228 grams of epsilon-caprolactone were reacted with 464 grams of allyl alcohol in the presence of 10 cc. acetic acid as catalyst by refluxing for 22.5 hours at 104–105° C. The reaction was stopped when the refractive index of the reaction mixture had reached a maximum. The reaction mixture was distilled and 185 grams of product were recovered. The product was a water-white liquid having a boiling point of 103–106° C. at 1.5 mm., an acidity of 0.0113 cc. N base/g., a density at 20/20 of 1.0025, an index of refraction at $n\ 30/D$ of 1.4489, a hydroxyl value of 9.7% (theory 9.9%) and a saponification equivalent of 173 (theory 172). The yield was 53.7%.

Example 20

342 grams of epsilon-caprolactone were reacted with 58 grams of allyl alcohol in the presence of 2 grams of 37% hydrochloric acid (containing 0.18% by weight HCl based on the total charge) as catalyst by heating and stirring for six hours at 126–145° C. The reaction mixture was then stripped in a goose-neck still to 153° C. at 4 mm.

381 grams of product were obtained in the form of a cream-colored wax having an acidity of 0.197 cc. N base/g., a hydroxyl value of 3.08%, a saponification equivalent of 129.6 and a molecular weight of 540. The hydroxyl, equivalent weight and molecular weight all correspond to an adduct having approximately 4 mols of caprolactone to one mol of allyl alcohol.

*Example 21*

114 grams of epsilon-caprolactone were reacted with 464 grams of heptanol-3 in the presence of 5 cc. of 2-ethylhexanoic acid as catalyst by heating and stirring together at 160–169° C. until the refractive index had reached a maximum. The reaction mixture was distilled under reduced pressure and 56 grams of a fraction having a boiling point of 138° C. at 2.5 mm. were collected. The fraction was a faintly yellow liquid having an index of refraction at $n\ 30/D$ of 1.4420, a density at 20/20 of 0.940, a hydroxyl value of 6.6% (theory 7.4%) and a saponification equivalent of 219 (theory 230). The yield was 24.3%.

*Example 22*

114 grams of epsilon-caprolactone were reacted with 408 grams of 4-methylpentanol-2 in the presence of 5 cc. of 2-ethylhexanoic acid as catalyst by heating and stirring together until the refractive index had passed a maximum. The reaction mixture was distilled at reduced pressure and yielded 23 grams of a water-white liquid having a boiling point of 126° C. at 2.5 mm., a refractive index at $n\ 30/D$ of 1.4368, an acidity of 0.011 cc. N base/g., a saponification equivalent of 212 (theory 216) and a hydroxyl value of 8.0% (theory 7.87%). The yield was 10.6%.

*Example 23*

A caprolactone/2-ethylhexanol reaction product similar to that of Example 12 was prepared. One portion (A) of this product was steamed under vacuum to remove low boiling impurities. Another portion (B) was acetylated by heating with acetic anhydride at 110–130° C. for four hours followed by stripping in a goose-neck still to a kettle temperature of 190° C. at 4 mm. The physical properties before and after acetylation were as follows:

|  | A | B |
|---|---|---|
| Color, Gardner | 1 | 1 |
| Acidity, cc. N base/g. | 0.0099 | 0.0888 |
| Hydroxyl, Percent OH | 3.11 | 0.16 |
| M.W. | 570 | |
| Viscosity, centipoises at 20° C. | 163 | 96 |

The data in the table shows that acetylation reduces the hydroxyl value to a considerable extent, thereby effecting a material improvement with regard to the resistance of the reaction product to water extraction from vinyl resins.

*Example 24*

228 grams of epsilon-caprolactone were admixed and heated with 1040 grams of 2-ethylhexanol in the manner described in Example 12. 244 grams of the water-white liquid hydroxy ester thus obtained were heated with 148 grams of phthalic anhydride in toluene solution for one hour at 119–126° C. to form the half ester of phthalic acid. To this was added 137 grams of 2-ethylhexanol and 0.5 cc. of alkane sulfonic acid catalyst and the reaction was continued for twelve hours at 119–175° C., the water evolved being removed through a decanter. The reaction mixture was neutralized with potassium hydroxide in methanol solution, washed with water and stripped in a goose-neck still to 188° C. at 4 mm. Finally, it was steamed under vacuum to remove the last traces of low boiling materials. 403 grams of a residue product, believed to have the formula

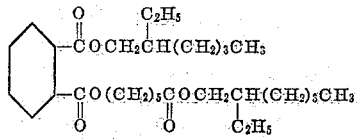

were recovered. This product had a color of 2 Gardner, an acidity of 0.003 cc. N base/g., a viscosity of 120 cp. at 20° C., a density at 20/20 of 1.005, a refractive index at $n\ 30/D$ of 1.4789 and a molecular weight (by saponification) of 500 (theory 504).

*Example 25*

A 2-ethylhexyl 6-hydroxyhexanoate was prepared as described in Example 12. The product was vacuum stripped instead of distilled and had a hydroxyl content of 6.25%. It was calculated to have an average of 1.25 mols of caprolactone per mol of 2-ethylhexanol. 400 grams of this product, containing 1.47 OH equivalents, were heated for thirty minutes at 115–140° C. with 218 grams of phthalic anhydride in the presence of 1 cc. of alkane sulfonic acid in toluene solution. 200 grams of 2-ethylhexanol were added and the heating was continued, the evolved water being removed by means of a decanter. After heating for seven hours to 171° C., the reaction was complete.

The reaction mixture was stripped in a goose-neck still to 190° C. at 4 mm. and then steamed under a vacuum to remove the last traces of low boiling material. 670 grams of residue product were recovered. The product had a color of 5 Gardner, an acidity of 0.0591 cc. N/base g., a molecular weight of 550, an index of refraction at $n\ 30/D$ of 1.4797 and a viscosity of 146 cp. at 20° C.

*Example 26*

228 grams of epsilon-caprolactone, 260 grams of 2-ethylhexanol and 146 grams of adipic acid were refluxed in xylene solution and in the presence of 5 cc. of 2-ethylhexanoic acid as catalyst, water being removed through a decanter. The reaction was completed in 9.5 hours at 149–193° C. The reaction product was stripped in a goose-neck still to a kettle temperature of 183° C. at 1 mm. followed by steaming for two hours at 150–180° C. at 40 mm. The final product, believed to have the lactone, 2-ethylhexanol and adipic acid residues arranged in random fashion but represented in the idealized formula:

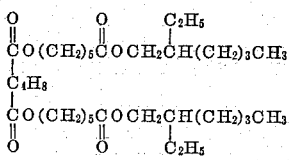

was obtained in a yield of 545 grams and had a color of 2 Gardner, an acidity of 0.239 cc. N base/g., a hydroxyl value of 0.20%, a viscosity of 78 cp. at 20° C. and a molecular weight of 560 (theory 598).

*Example 27*

432 grams of the n-hexyl 6-hydroxyhexanoate, as prepared in Example 15, were reacted with 160 grams of pimelic acid in the presence of 2 cc. of alkane sulfonic acid catalyst by refluxing in toluene solution. The evolved water was removed through a decanter. The reaction required 5.5 hours at 122–145° C. The reaction product was neutralized, stripped in a goose-neck still to a kettle temperature of 183° C. at 6 mm. and steamed for two hours at 145–172° C. at 40 mm. The product, believed to have the formula

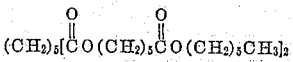

was obtained in a yield of 453 grams and had a color of 5 Gardner, an acidity of 0.160 cc. N base/g., a viscosity of 60 cp. at 20° C., a density of 20/20 of 0.996, an index of refraction at $n\ 30/D$ of 1.4512, a molecular weight of 580 (theory 556) and a saponification equivalent of 140 (theory 139).

*Example 28*

272 grams of the ester prepared in Example 6, 137 grams of 2-ethylhexanol and 148 grams of phthalic anhydride were reacted, in the presence of 0.5 cc. of alkane sulfonic acid catalyst, by refluxing in xylene solution, the evolved water being removed through a decanter. The reaction required forty-two hours at 160–178° C. The reaction mixture was neutralized with an alcoholic solution of potassium hydroxide, washed with water, and finally stripped in a goose-neck still to 190° C. at 1.5 mm. The product was obtained in a yield of 497 grams and had a color of 6 Gardner, an acidity of 0.0846 cc. N base/g., a density at 20/20 of 1.000, an index of refraction at $n\ 30/D$ of 1.4792 and a saponification equivalent of 181.5 (theory 177.4).

*Example 29*

232 grams of the epsilon-caprolactone-butyl "Cellosolve" ester prepared in Example 18 were reacted with 148 grams of phthalic anhydride in the presence of alkane sulfonic acid catalyst by refluxing in toluene solution, the evolved water being removed through a decanter. The reaction was completed in thirteen hours at 132–155° C. The reaction mixture was neutralized with an alcoholic solution of potassium hydroxide, washed with water and finally stripped in a goose-neck still to 191° C. at 3 mm. The product which had the formula

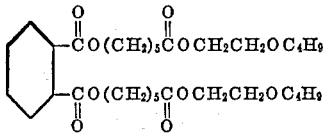

also had a color of 9 Gardner, a purity (by saponification) of 99.3%, an index of refraction at $n\ 30/D$ of 1.4772, a density at 20/20 of 1.076 and an acidity of 0.062 cc. N base/g.

*Example 30*

228 grams of epsilon-caprolactone, 260 grams of 2-ethylhexanol and 5 cc. of 37% hydrochloric acid (containing 0.45% HCl based on the total charge) as catalyst were heated and stirred for 2.5 hours at 120–149° C. The reaction mixture was stripped in a goose-neck still to 200° C. at 2 mm. 296 grams of a product were obtained having a saponification equivalent of 175.4, corresponding to approximately 2 mols of caprolactone per mol of 2-ethylhexanol.

280 grams of the product so obtained were refluxed with 86 grams of methacrylic acid in benzene solution with 3.5 grams of sulfuric acid as catalyst and in the presence of 3.5 grams hydroquinone and 7 grams of copper sponge to prevent polymerization. Water was removed through a decanter and the reaction was complete in six hours at 88–92° C. The reaction mixture was washed with aqueous caustic, then water, and finally stripped in a goose-neck still to 40° C. at 5 mm. 230 grams of a liquid product were obtained having an amber color, a refractive index at $n\ 30/D$ of 1.4560, a density at 20/20 of 0.999, and a saponification equivalent of 141.5. The theoretical saponification equivalent for the methacrylate ester of a 2:1 adduct is 142.

*Example 31*

228 grams of epsilon-caprolactone and 316 grams of oxo-decanol were heated and stirred in the presence of 2.7 grams of acetic acid catalyst until the refractive index had reached a maximum. This required seven hours at 130–190° C. The reaction mixture was stripped in a goose-neck still to 190° C. 415 grams of a liquid product were obtained. It had a color of 6 Gardner, an acidity of 0.023 cc. N base/g., a density at 20/20 of 0.961, an index of refraction at $n\ 30/D$ of 1.4527 and a saponification equivalent of 213.8, indicating that the product contained 1.6 mols of lactone per mol of decanol.

350 grams of the lactone-decanol adduct thus obtained were refluxed with 97 grams of methacrylic acid and 2 grams of alkane sulfonic acid catalyst in benzene solution and in the presence of 2.5 grams of hydroquinone and 5 grams of copper sponge to prevent polymerization. Water was removed through a decanter. The esterification was completed in 12.5 hours at 94–101° C. The reaction mixture was washed with aqueous caustic, then water, and finally stripped in a goose-neck still to 81° C. at 4 mm. 401 grams of a viscous liquid product were obtained having a color of 12 Gardner, no appreciable acidity, a density at 20/20 of 0.970, an index of refraction at $n\ 30/D$ of 1.4545 and a saponification equivalent of 160.

This ester is also useful as an intermediate in the preparation of resins. It may be copolymerized with other polymerizable materials such as vinyl chloride or a polyglycol dimethacrylate to provide a "built-in" plasticizer.

The products formed in Examples 12, 13 and 14 and 23 to 29 were incorporated, as plasticizers, in "Vinylite" VYNW, a copolymer containing 97% vinyl chloride and 3% vinyl acetate, and the resulting plasticized resins were tested to evaluate their pertinent characteristics. The results are indicated in the table immediately below:

| Example No. | 12 | 13 | 14 | 23A | 23B | 24 | 25 | 26 | 27 | 28 | 29 | A |
|---|---|---|---|---|---|---|---|---|---|---|---|---|
| Effectiveness, percent in VYNW | 39.6 | 39.3 | 40.0 | 39.0 | 35.0 | 38.6 | 38.7 | 36.5 | 34.0 | 40.0 | 38.2 | 38.4 |
| Tensile strength, p.s.i. | 2,575 | 2,620 | 2,660 | 2,730 | 2,850 | 2,525 | 2,570 | 2,725 | 2,925 | 2,550 | 2,640 | 2,400 |
| Elongation, percent | 375 | 380 | 380 | 385 | 375 | 365 | 360 | 385 | 385 | 385 | 345 | 360 |
| ASTM Stiffness Modulus, p.s.i. | 890 | 950 | 830 | 770 | 855 | 730 | 690 | 870 | 775 | 775 | 780 | 800 |
| Flex temperature ($T_F$), °C | −47 | −43.5 | −36 | −44 | −37 | −36 | −34 | −46 | −43 | −36 | −32 | −35 |
| $T_4$, °C | −19 | −18 | −14 | −17 | −15 | −10 | −10.5 | −18.5 | −15.5 | −12 | −9 | −8 |
| Brittle temperature, °C | −48 | −45 | −36 | −41 | −36 | −30 | −30 | −44 | −42 | −32 | −30 | −33 |
| Percent Extraction: | | | | | | | | | | | | |
| Oil | 21.3 | 18.0 | 11.2 | 17.1 | 17.1 | 15.3 | 15.1 | 19.7 | 19.0 | 17.3 | 16.7 | 18 |
| Water | 3.6 | 2.3 | 1.2 | 2.1 | 0.4 | 0.4 | 0.6 | 1.2 | 0.6 | 0.8 | 2.5 | 0.1 |
| Shore Hardness ("A") | 67 | 66 | 62 | 61 | 63 | 63 | 61 | 64 | 65 | 62 | 64 | 65 |
| SPI Volatile loss, percent in 24 hrs. at 70° C. | 7.2 | 3.7 | | 3.7 | 1.3 | 2.4 | 2.0 | 3.4 | 3.1 | 2.2 | 1.7 | 4.2 |
| Sweat-out: two weeks | None | None | Waxy Bloom | None | None | None | None | None | None | Slight | None | None |

Column A in the foregoing table shows the comparable values for di(2-ethylhexyl) phthalate, the plasticizer most widely used heretofore with vinyl chloride-vinyl acetate copolymers. Comparison of the data will reveal immediately that the lactone-derived hydroxy esters and acylated hydroxy esters have definite advantages in low temperature performance and volatile loss and are comparable in oil and water extraction values.

It is apparent that various modifications and uses will occur to those skilled in the art upon reading this description. All such modifications and uses are intended to be included within the scope of the invention as defined in the accompanying claims.

We claim:

1. Method for preparing a hydroxyl-terminated polylactone ester which comprises heating a hydroxyalkanoic acid lactone of the group consisting of unsubstituted and lower alkyl-substituted lactones having from six to eight carbon atoms in the ring with an organic compound having from one to three reactive hydrogens present in a member of the group consisting of hydroxyl and amino groups and in the presence of a catalyst of the group consisting of acetic acid, acetic anhydride, 2-ethylhexanoic acid and benzoic acid to a temperature between about 50 and about 250° C.

2. Method for preparing a hydroxyl-terminated polylactone ester which comprises heating a lactone of the group consisting of unsubstituted and lower alkyl-substituted epsilon-caprolactones with an aliphatic alcohol having up to ten carbon atoms and from one to three hydroxyl groups and in the presence of a catalyst of the group consisting of acetic acid, acetic anhydride, 2-ethylhexanoic acid and benzoic acid to a temperature between about 50 and about 250° C.

3. Method for preparing a hydroxyl-terminated polylactone ester which comprises heating a mixture of lactones of the group consisting of unsubstituted and lower alkyl-substituted epsilon-caprolactones with an aliphatic alcohol having up to ten carbon atoms and from one to three hydroxyl groups and in the presence of a catalyst of the group consisting of acetic acid, acetic anhydride, 2-ethylhexanoic acid and benzoic acid to a temperature between about 50 and about 250° C.

4. Method for preparing a hydroxyl-terminated polylactone ester which comprises heating a lactone of the group consisting of unsubstituted and lower alkyl-substituted epsilon-caprolactones with a glycol having up to ten carbon atoms and in the presence of a catalyst of the group consisting of acetic acid, acetic anhydride, 2-ethylhexanoic acid and benzoic acid to a temperature between about 50 and about 250° C.

5. Method for preparing a hydroxyl-terminated polylactone ester which comprises heating a lactone of the group consisting of unsubstituted and lower alkyl-substituted epsilon-caprolactones with a monohydric alcohol having up to ten carbon atoms and in the presence of a catalyst of the group consisting of acetic acid, acetic anhydride, 2-ethylhexanoic acid and benzoic acid to a temperature between about 50 and about 250° C.

6. Method which comprises heating a lactone of the group consisting of unsubstituted and lower alkyl-substituted epsilon-caprolactones with an aliphatic alcohol having up to ten carbon atoms and from one to three hydroxyl groups and in the presence of a catalyst of the group consisting of acetic acid, acetic anhydride, 2-ethylhexanoic acid and benzoic acid to a temperature between about 50 and about 250° C. for forming a hydroxyl-terminated polylactone ester, and reacting said polylactone ester with a member of the group consisting of monocarboxylic acids having up to eight carbon atoms, dicarboxylic acids having up to ten carbon atoms, and their anhydrides.

7. Method which comprises heating a lactone of the group consisting of unsubstituted and lower alkyl-substituted epsilon-caprolactones with a monohydric aliphatic alcohol having up to ten carbon atoms and in the presence of a carboxylic acid catalyst to a temperature between about 50 and about 250° C. for forming a polylactone ester having a terminal hydroxyl group, and reacting said polylactone ester with a member of the group consisting of monocarboxylic acids having up to eight carbon atoms, dicarboxylic acids having up to ten carbon atoms, and their anhydrides.

8. Method which comprises heating a lactone of the group consisting of unsubstituted and lower alkyl-substituted epsilon-caprolactones with a glycol having up to ten carbon atoms in the presence of a catalyst of the group consisting of acetic acid, acetic anhydride, 2-ethylhexanoic acid and benzoic acid to a temperature between about 50 and about 250° C. for forming a polylactone ester having two terminal hydroxyl groups, and reacting said polylactone ester with a member of the group consisting of monocarboxylic acids having up to eight carbon atoms, dicarboxylic acids having up to ten carbon atoms, and their anhydrides.

References Cited in the file of this patent
UNITED STATES PATENTS

| | | |
|---|---|---|
| 1,927,295 | Powers | Sept. 19, 1933 |
| 2,120,756 | Kyrides | June 14, 1938 |
| 2,260,295 | Carruthers | Oct. 28, 1941 |
| 2,399,286 | Muskat et al. | Apr. 30, 1946 |
| 2,449,990 | Gresham et al. | Sept. 28, 1948 |
| 2,458,421 | Reynolds et al. | Jan. 4, 1949 |
| 2,458,422 | Reynolds et al. | Jan. 4, 1949 |
| 2,526,554 | Gresham et al. | Oct. 17, 1950 |
| 2,559,510 | Mikeska et al. | July 3, 1951 |
| 2,573,701 | Filachione et al. | Nov. 6, 1951 |
| 2,578,684 | Filachione et al. | Dec. 18, 1951 |
| 2,676,941 | Rehberg | Apr. 27, 1954 |
| 2,712,025 | Rehberg et al. | June 28, 1955 |

FOREIGN PATENTS

| | | |
|---|---|---|
| 936,746 | Germany | Dec. 22, 1955 |

OTHER REFERENCES

Beilstein, 3, 343 (1918), 128–9, 1st Supp. (1929), 238, 240, 2nd Supp. (1942).